Dec. 26, 1961 — R. B. BERG — 3,014,441
TRANSPLANTER
Filed July 13, 1959 — 3 Sheets-Sheet 1

INVENTOR
R.B. BERG
BY
ATTORNEY

Dec. 26, 1961 R. B. BERG 3,014,441
TRANSPLANTER
Filed July 13, 1959 3 Sheets-Sheet 2

INVENTOR
R. B. BERG
BY
ATTORNEY

United States Patent Office 3,014,441
Patented Dec. 26, 1961

3,014,441
TRANSPLANTER
Robert B. Berg, 835 Daugherty St.,
New Smyrna Beach, Fla.
Filed July 13, 1959, Ser. No. 826,800
10 Claims. (Cl. 111—2)

This invention relates to the cultivation of the soil, including the planting of seed in an especially prepared and sheltered plant bed and the growing of small plants until they have attained the desired size and degree of maturity sufficient to permit them to be transplanted, as well as to the equipment employed in the transplanting of such plants.

The invention is concerned with a transplanter which can be applied to a self-propelled vehicle such as a tractor and driven from the power take-off of such tractor for accurately and rapidly transplanting plants in substantial volume with a minimum of labor.

Prior transplanters have been unsatisfactory due to the fact that they were complicated, expensive, inefficient and unreliable, and although given constant attention, caused injury to plants, did not transplant them with the desired regularity and in proper alignment and did not satisfactorily apply earth around the roots of the plants.

It is an object of the invention to overcome the difficulties enumerated and to provide a dependable transplanter applicable to a tractor and constructed to be driven from the power take-off, as well as a transplanter with which plants may be gently gripped and moved into their ultimate position, after which the earth-packing mechanism will press the earth around the roots, allowing the plant-holding mechanism to remain stationary or at a particular location until the operation is accomplished notwithstanding the fact that the tractor moves forward.

Another object of the invention is to provide a transplanter which will set plants either singly or in multiple rows with maximum accuracy, efficiency and reliability and with minimum attention so that the plants may be properly located as to direction and distance so that they may be readily cultivated by mechanical means between the plants.

Figure 1:
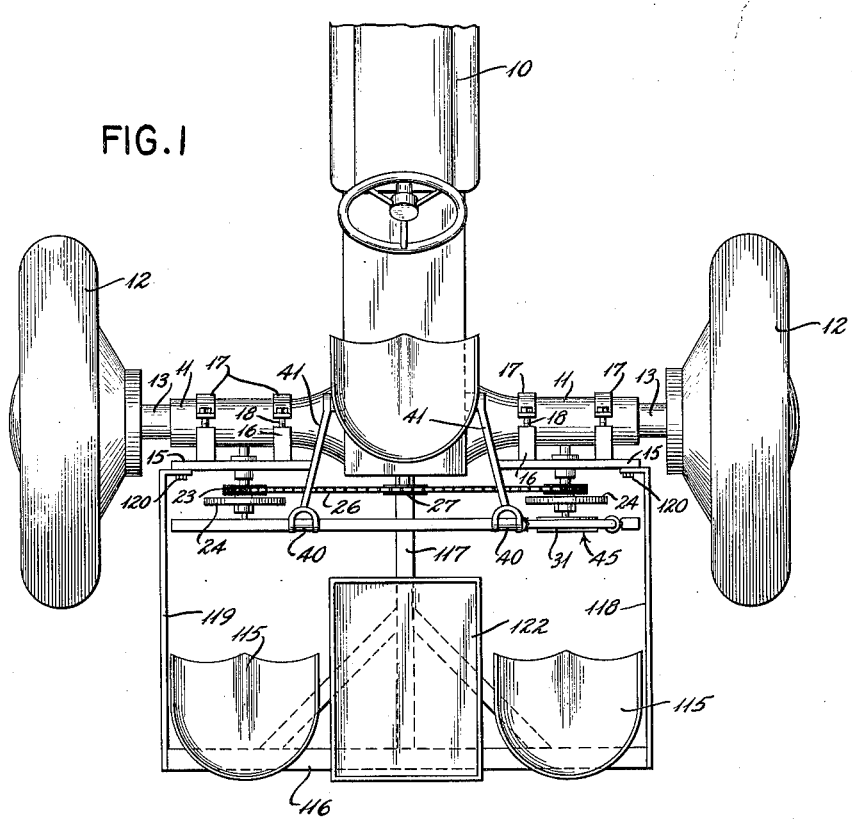
Figure 2:
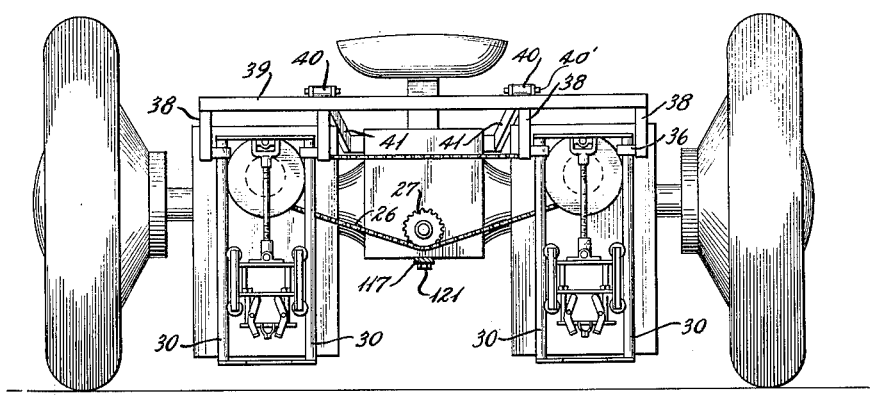
Figure 3:
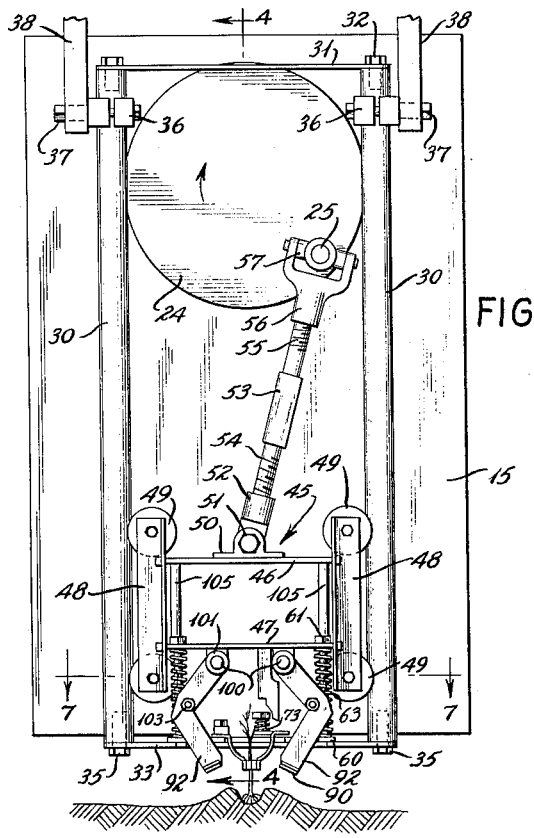
Figure 4:
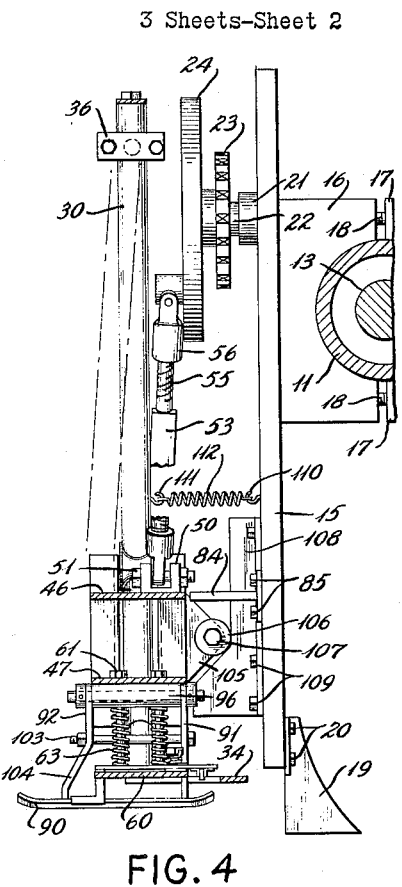
Figure 5:
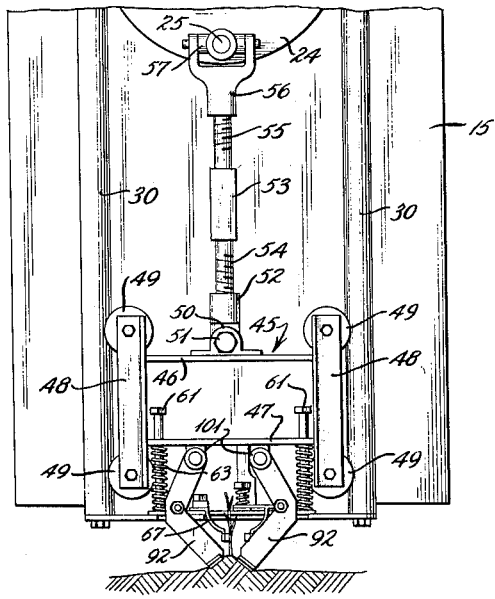
Figure 6:
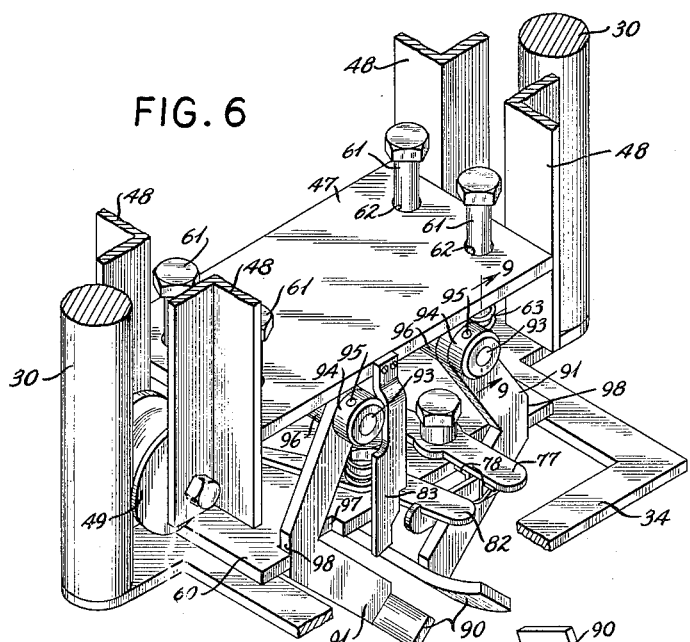
Figure 7:
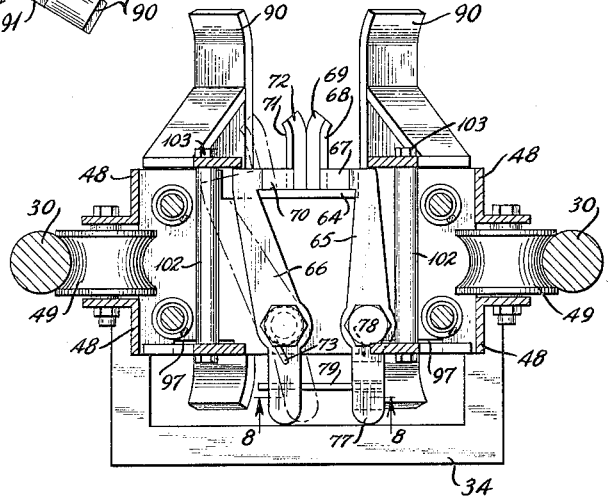
Figure 8:
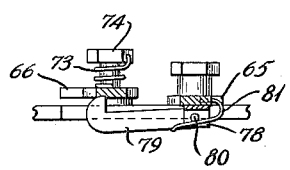

Other objects and advantages of the invention will be apparent from the following description taken in conjunction with the accompanying drawings wherein:

FIG. 1 is a top plan view illustrating one application of the invention;

FIG. 2, a rear elevation;

FIG. 3, a similar similar view partially depressed on an enlarged scale of the transplanter;

FIG. 4, a vertical section at right angles to and on the line 4—4 of FIG. 3;

FIG. 5, a view similar to that of FIG. 3 with the parts fully depressed into position with the plant fully set;

FIG. 6, an enlarged fragmentary perspective of the setting ram or head viewed from the opposite direction to that of FIGS. 3 and 5;

FIG. 7, an enlarged section on the line 7—7 of FIG. 3;

FIG. 8, a horizontal section on the line 8—8 of FIG. 7; and

Figure 9:
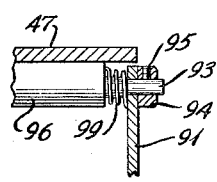

FIG. 9, a vertical section on the line 9—9 of FIG. 6.

Briefly stated, the invention is a device for transplanting small plants, the device being adapted to be mounted at one or both sides of a tractor for transplanting in single or multiple rows. The invention is composed of spaced parallel guides disposed in upright position between which the head or ram of the transplanter reciprocates to carry plants from an elevated to their final position. To the head is pivotally attached one end of a longitudinally adjustable connecting rod, the other end of which is attached by a universal joint to a crank pin on a disk mounted on a shaft carrying a sprocket driven by a chain from the power take-off of the tractor. The parallel guides and the head are carried by means of an elevatable crossbar pivoted to the hydraulic lift arms of a tractor in order that the head and guides can be elevated, which is permitted due to the universal joint between the connecting rod and the crank pin, when the tractor reaches the end of the row being planted to avoid an obstruction or at other times when desired. The head is raised and lowered by the connecting rod which carries with it a fixed frame member and a floating lower plate connected to the fixed frame by bolts and buffer springs. On the floating plate is attached a pair of opposed clamping jaws one movable and one fixed constructed to be moved toward and from each other resiliently to gently grasp or engage a young tender plant and hold it during a lowering plant setting operation. Opposed bell crank impactor arms are mounted on the lower part of the head and as soon as the plant is in position they pack the earth at each side of the same actuated by the downward movement of the head. Mechanism is provided whereby the head remains at the location of the plant until the complete plant setting operation is performed notwithstanding the fact that the tractor is carried forward, such mechanism including a cam plate mounted on the fixed part of the mechanism and a cam wheel mounted on the head to move the head rearwardly substantially at the same speed as the forward speed of the tractor.

With continued reference to the drawings, a tractor 10 is provided, having a rear axle housing 11 and ground-engaging wheels 12 mounted on axles 13 slidable in the housing 11 to vary the space between such wheels to span one or two rows of plants.

A mounting plate 15 is disposed in a substantially vertical plane and is attached by a pair of mounting blocks 16 and cooperating clamps 17 connected to the mounting blocks by bolts 18 to attach the mounting plate to the rear axle housing 11. A plow 19 is mounted centrally on the front side of the lower portion of the mounting plate 15 by bolts 20 to make it possible to plow a shallow furrow in the top of a row or hill as the tractor moves through the field.

The upper portion of the mounting plate is provided with a centrally located boss 21 and a shaft 22 on which is rotatably received a sprocket 23 attached to a circular plate or crank 24 having a lug 25 adjacent the periphery thereof. The sprocket 23 is driven by a chain 26 from a sprocket 27 mounted on the power take-off shaft of the tractor 10. If desired, the tractor 10 may be provided with two transplanter units one at each side driven simultaneously from the same source of power by the chain 26, it being noted that whereas two units are illustrated and described, a single unit may be used merely by extending the chain 26 around only one sprocket 23 and around the sprocket 27 on the power take-off shaft.

The plant transplanting unit comprises a pair of substantially parallel rods 30 connected at their upper ends to a plate 31 by bolts 32 and connected at their lower ends to a plate 33 having an offset portion 34 by bolts 35 to form a substantially rectangular frame. In order to pivotally mount the frame a clamp 36 is provided adjacent to the upper end of each of the upright bars 30 and such clamps are provided with pivots 37 for engagement with trunnions 38 mounted on a crossbar 39. A pair of journals 40 are located in spaced relation on the crossbar and are pivotally suspended from the hydraulic lift arms 41 of the tractor by pins 40' to raise and lower the transplanter at the end of each row.

A ram or transplanting unit 45 is located between the upright rods 30 and comprises upper and lower plates 46 and 47 connected at each of their ends by a pair of angle members 48. An upper and lower concave roller 49 is disposed between each pair of angle members 48 and such rollers engage the rods 30 to guide the ram 45 as it is reciprocated up and down.

In order to move the ram up and down the upper plate 46 is provided with a yoke 50 mounted on the upper surface thereof and such yoke is provided with a bolt 51 which pivotally connects a clevis 52 to the ram. A turnbuckle 53 having left and right hand threads 54 and 55 connects the clevis 52 with a yoke 56 pivotally connected to a universal joint member 57 rotatably mounted on the lug 25 of the circular plate 24.

The lower plate 47 is connected to a floating plate 60 by a plurality of bolts 61 slidably mounted in openings 62 in the plate 47 and threaded into the floating plate 60. Buffer springs 63 are disposed around the bolts 61 between the lower plate 47 and the floating plate 60 to maintain such plates in fixed spaced relation until such time as the ram descends and the floating plate makes contact with the plate 33 where it stops while the ram completes its downward stroke.

The floating plate 60 has a cut out portion 64 centrally of its rear edge to accommodate a fixed jaw 65 and a movable jaw 66. The fixed jaw 65 has a downwardly and inwardly curved portion 67 terminating in a rearwardly extending flange 68 having a cushion 69 of resilient material such as sponge rubber attached thereto. The movable jaw 66 has a similar downwardly and inwardly curved portion 70 terminating in an outwardly extending flange 71 with a resilient cushion 72 mounted thereon. The cushions 69 and 72 are adapted to hold a plant to be planted and in order to keep the cushions in contact with the plant and securely held therebetween a light torsion spring 73 is provided having one end mounted in the movable jaw 66 and the opposite end held by the pivot 74. The fixed jaw 65 has a tang 77 projecting in front of the floating plate 60 and a pair of brackets 78 are attached to the lower side of such tang. These brackets are adapted to support a catch 79 by a pivot 80. Catch 79 is normally biased upwardly by a spring 81 mounted in fixed jaw 65 and bearing against the lower edge of the catch 79.

In order to open the jaws and release the plant at the end of the stroke of the ram, the movable jaw 66 has a tang 82 projecting forwardly of the floating plate 60 and when the ram nears the completion of its downward stroke the tang 82 is engaged by a cam plate 83 mounted on the lower ram plate 47 to cause the movable jaw to move out of contact with the fixed jaw and to release the plant held therebetween. The movable jaw is held in the open position during the ascent of the ram by the catch 79 in order to permit the insertion of a new plant. During the ascent of the ram an operator holds a plant between the jaws and as the ram reaches the top of its ascent a pin 84 mounted on the plate 15 by screws or other fastener means 85 will strike the catch 79 and release the movable jaw 66 to permit the spring 73 to close the jaws and clamp the plant held by the operator.

In order to pack the plant in the earth, the ram is provided with a pair of impactor shoes 90 supported by a pair of forward angularly disposed arms 91 and a pair of rear angularly disposed arms 92. The arms 91 are mounted on pivot pins 93 by collars 94 and set screws 95. Pivot pins 93 are supported by blocks 96 connected to the lower surface of the plate 47. Floating plate 60 is provided with recessed portions 97 in the forward edge to receive the arms 91 and impactor shoes 90 attached to the lower extremities of such arms to move inwardly and downwardly to compress the earth about the plant. The arms 91 have flattened portions 98 so that when the compactor shoes 90 have been moved toward each other a predetermined amount the flattened portions 98 will assume a substantially vertical plane so that any further downward movement of the ram will not cause the impactor shoes to move closer together and crush the plant. The arms 91 are normally biased outwardly by torsion springs 99 about each pivot pin 93 and having one end connected to the block 96 and the opposite end connected to the arm 91.

The rear arms 92 are mounted on pivots 100 by collars 101 and are connected to the arms 91 by spacers 102 and bolts and nuts 103. The lower portions of the arms 92 are provided with an outwardly projecting portion 104 to permit free movement of the plant holding jaw 66 when the impactor shoes 90 are moved inwardly and the movable jaw 66 moves outwardly to release the plant. During the process of placing the plant in the furrow provided by the plow 19 and packing the earth around the plant by the impactor shoes, the tractor will continue to move in a forward direction and in order to maintain the plant being planted in a substantially fixed position relative to the earth the ram is adapted to move rearwardly at approximately the same speed that the tractor moves forward. This is accomplished by providing the ram with a pair of brackets 105 having rollers 106 mounted thereon by bolts 107. Rollers 106 contact a cam plate member 108 mounted on the plate 15 by screws 109 to cause the rods 30 which carry the ram to move about the pivot 37 to the position shown in phantom lines in FIG. 4. In order to maintain the roller 106 in intimate engagement with cam plate 108 the plate 15 is provided with a pair of hooks 110 connected by springs 112 to hooks 111 one on each of the rods 30 and allowing the lower portion of such rods and the ram carried thereon to be pivoted away from the plate.

A pair of seats 115 are provided to accommodate operators who place the plants between the jaws of the device. The seats are mounted on a crossbar 116 connected to a central support bar 117 and to a pair of side supports 118 and 119 which are supported on the mounting plates 15 by fasteners 120. The support bar 117 is connected to the undercarriage of the vehicle by fasteners 121. A tray or box 122 is positioned between the seats 115 in a position readily accessible to both operators and such tray is adapted to contain the plants which the operators place in the transplanter.

In the operation of the device it is desired to transplant most row crops with exact spacing between the individual plants. In order to do this, operators on seats mounted behind a tractor hold the plants in a position to be received by a fixed jaw 65 and a movable jaw 66. During the ascent of the ram 45 the jaws are maintained open and upon reaching the top of the stroke of the ram, the jaw 66 is released and closes against the fixed jaw 65 to grasp the plant held by the operator. The ram then descends and places the plant in a furrow dug by a plow immediately in front of the ram and packs or tamps the earth around the plant by means of a pair of impactor shoes which fill in the furrow and presses the earth around the plant. The arms which support the impactor shoes are provided with cam surfaces and flat portions to cause the shoes to move inwardly and downwardly until the shoes are close to the plant then to move vertically to prevent bruising or crushing the plant.

When the plant has been securely placed in the earth, the jaws which held the plant are opened and the ram returned to the upper position. As the ram begins its upward travel, the impactor shoes are opened and the plant is left standing in the row.

The tractor, of course, does not stop as each plant is placed in the earth and tamped and in order to maintain the plant in fixed position relative to the earth, the ram is adapted to move rearwardly at the same speed that the tractor moves forward. This is accomplished by a pair of rollers on the ram cooperating with a pair of cam plates mounted on the base plate to move the ram rearwardly during the last portion of the descent of the ram or during the time that the plant is actually placed in the earth and tamped.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A transplanting unit for attachment to a vehicle having a power take-off and hydraulic lift arms, comprising a fixed mounting plate having a pair of clamps for attaching the mounting plate on said vehicle, a plow attached to the lower central portion of said mounting plate in a position to produce a furrow, a shaft mounted centrally of the upper portion of said mounting plate, a rotatable disk mounted on said shaft, means for driving said disk from the power take-off of the vehicle, a crossbar pivotally connected to said hydraulic lift arms of the vehicle, a pair of substantially parallel guide bars pivotally suspended from said crossbar, a ram comprising a fixed frame between said guide bars having rollers for engaging said guide bars and allowing said frame to reciprocate, a floating plate suspended below said frame, bolts slidably mounted in openings in said frame and suspending said plate, said floating plate being normally biased downwardly by buffer springs about said bolts, a first plant clamping jaw fixed to said floating plate, a second plant clamping jaw pivotally mounted on said floating plate, spring means for moving said second plant clamping jaw into cooperative relation with the first, a cam mounted on said frame for moving said second jaw out of engagement with the first, a spring-loaded catch for engagement with said second jaw to maintain said jaw out of engagement with the first, a pair of impactor shoes pivotally connected to said frame, cooperating means on said floating plate and said impactor shoes for causing said impactor shoes to move to a predetermined spacing and to maintain said spacing during further descent of said frame, a connecting rod joining said ram to said rotating disk for causing reciprocating movement of said ram between said guide bars, a pair of cam wheels mounted on said frame for engagement with a pair of cam plates attached to said mounting plate, spring means between said guide bars and said mounting plate to maintain said cam wheels and the guide plates in contact, and a pin attached to said mounting plate in a position to contact said plant clamping jaw catch at the upper limit of movement of said ram for releasing said catch from said clamping jaw.

2. A transplanting unit for use with a vehicle having a power take-off and lift arms, comprising a mounting element for attachment to said vehicle, a crank rotatably carried substantially centrally of said mounting element, means for rotating said crank from said power take-off, a frame pivotally suspended from said lift arms and including guide rods, a ram reciprocably disposed on said frame in cooperative relation with said guide rods, said ram including a fixed plate and a floating plate, means normally biasing said floating plate away from said fixed plate, a fixed jaw and a movable jaw carried by said floating plate for gripping a plant, spring means carried by said floating plate for urging said movable jaw toward said fixed jaw, cam means carried by said fixed plate for moving said movable jaw away from said fixed jaw, a pair of impactor shoes pivotally connected to said ram, cooperating means on said floating plate and said impactor shoes for moving said impactor shoes toward each other to pack earth around the plant when said ram is lowered and a connecting rod joining said ram to said crank for reciprocating said ram relative to said guide rods whereby a plant may be placed in a furrow at definite intervals and the earth packed therearound.

3. A transplanting unit for use with a tractor having a power take-off comprising a mounting plate for attachment to a tractor, a frame having vertical guides, means for supporting said frame on the tractor adjacent to the mounting plate, a ram movable vertically on said guides between an upper position and a lower position, means on said mounting plate driven by the power take-off of the tractor for raising and lowering the ram, a pair of jaws for engaging a plant carried by the ram, means on said mounting plate and ram for closing the jaws around a plant as the ram reaches its upper position, the said jaws serving to locate the plant in the ground as the ram nears its lower position, a pair of impactor shoes mounted on the ram for tamping the earth around a plant, cooperating means on the ram and on the shoes for moving said shoes inwardly and downwardly as the ram reaches its lower position for compressing the earth around the plant while the latter is held by said jaws and for retracting said shoes as the ram begins its upward travel, and means on the ram for opening and holding open said jaws for releasing the plant in the ground at the end of the compressing operation.

4. The structure of claim 3 including coacting means on the mounting plate and ram automatically acting as the ram descends to move the ram rearwardly away from the tractor to keep the ram substantially stationary with relation to the ground as the tractor continues to move forward during the time the plant is being set in the ground and compressed.

5. The structure of claim 3 in which said cooperating means includes cam surfaces for moving said shoes downwardly and inwardly to a predetermined spacing and then vertically downward.

6. A transplanting unit for use with a tractor having a power take-off comprising a mounting plate for attachment to a tractor, a frame having vertical guides and a bottom plate, means for supporting said frame on the tractor adjacent to the mounting plate, a ram movable vertically on the guides between an upper position and a lower position, means on said mounting plate and driven by the power take-off of the tractor for raising and lowering the ram, said ram including a fixed plate and a floating plate, means normally biasing said floating plate away from said fixed plate, a pair of jaws for engaging a plant carried by said floating plate, means on said mounting plate and said floating plate for closing the jaws around a plant as the ram reaches its upper position, a pair of impactor shoes for tamping the earth around a plant, arms mounted on the fixed plate and connected to said shoes, said bottom plate serving to stop the descent of the floating plate when the plant is located in the ground and prior to the completion of the down stroke of the ram, cooperating means on said arms and said floating plate for moving said shoes inwardly and downwardly as the ram completes its downward stroke for compressing the earth around the plant while it is held by said jaws and for retracting said shoes as the ram begins its upward travel, and means on said fixed plate for opening said jaws to release the plant in the ground at the end of the tamping operation.

7. The structure of claim 6 including coacting means on the mounting plate and ram automatically acting as the ram descends to move the ram rearwardly away from the tractor to keep the ram substantially stationary with relation to the ground as the tractor continues to move forward during the time the plant is being set in the ground and tamped.

8. The transplanting unit of claim 6 in which said means for supporting said frame on the tractor comprises a detachable clamp for fastening said supporting means to said frame permitting vertical adjustment of the frame and its guide means with relation to the ground.

9. A transplanting unit in combination with a tractor having a power take-off and lift arms comprising a mounting plate, means for clamping said mounting plate on said tractor, a frame means having vertical guides pivotally supported from said lift arms adjacent to the mounting plate, a ram movable vertically on said guides between an upper position and a lower position, means on said mounting plate and driven by the power take-off of the tractor for raising and lowering said ram, said ram having a fixed plate and a floating plate suspended below said fixed plate, means for biasing said floating plate away from said fixed plate, a pair of jaws for engaging a plant carried by said floating plate, means on said mounting plate coacting with means on said ram for closing the jaws as the ram reaches its upper position, a pair of impactor shoes below the floating plate, arms pivoted to the fixed plate and extending below the floating plate for supporting said shoes, cooperating cam surfaces on said arms and on said floating plate for moving said shoes toward each other to compress earth around a plant as the ram is lowered, and means on said fixed plate for opening said jaws to release a plant in the ground.

10. The structure of claim 9 including in combination therewith coacting cam and follower means on the mounting plate and on the ram for automatically acting as the ram descends to swing the frame on its pivot away from the tractor as the tractor moves forward to keep the ram substantially stationary with relation to the ground during the time the plant is being placed in the ground and tamped.

References Cited in the file of this patent

UNITED STATES PATENTS

| | | |
|---|---|---|
| 120,801 | Waite | Nov. 7, 1871 |
| 193,734 | Tennent | July 31, 1877 |
| 345,184 | Smith | July 6, 1886 |
| 516,745 | Pitt | Mar. 20, 1894 |
| 577,539 | Speidel | Feb. 23, 1897 |
| 653,625 | Morgan | July 10, 1900 |
| 684,410 | Collins | Oct. 15, 1901 |
| 1,486,512 | Boon | Mar. 11, 1924 |
| 1,657,944 | Stocker et al. | Jan. 31, 1928 |
| 1,765,468 | Vollink | June 24, 1930 |
| 2,223,559 | Fleming | Dec. 3, 1940 |
| 2,719,498 | Goolsby | Oct. 4, 1955 |
| 2,949,083 | Knowles | Aug. 16, 1960 |

FOREIGN PATENTS

| | | |
|---|---|---|
| 637,693 | France | Feb. 6, 1928 |